(12) United States Patent
Bell et al.

(10) Patent No.: US 8,078,598 B2
(45) Date of Patent: Dec. 13, 2011

(54) EFFICIENT SQL ACCESS TO POINT DATA AND RELATIONAL DATA

(75) Inventors: Trevor Bell, Torrance, CA (US); Christopher Patrick Milam, Lake Forest, CA (US)

(73) Assignee: Siemens Aktiengesellschaft, Munich (DE)

( * ) Notice: Subject to any disclaimer, the term of this patent is extended or adjusted under 35 U.S.C. 154(b) by 1152 days.

(21) Appl. No.: 11/651,199

(22) Filed: Jan. 8, 2007

(65) Prior Publication Data
US 2009/0327212 A1 Dec. 31, 2009

Related U.S. Application Data

(60) Provisional application No. 60/757,793, filed on Jan. 9, 2006.

(51) Int. Cl.
*G06F 17/30* (2006.01)
(52) U.S. Cl. ........ 707/705; 707/706; 707/714; 707/754; 707/755; 707/756; 707/771; 707/772; 707/791; 707/802
(58) Field of Classification Search .................. 707/1, 2, 707/3, 999.001, 999.002, 999.003, 705, 706, 707/714, 754, 755, 756, 771, 772, 791, 802
See application file for complete search history.

(56) References Cited

U.S. PATENT DOCUMENTS

| | | | |
|---|---|---|---|
| 6,078,926 A * | 6/2000 | Jensen et al. | 1/1 |
| 6,108,651 A * | 8/2000 | Guha | 1/1 |
| 6,700,590 B1 | 3/2004 | DeMesa et al. | |
| 7,069,514 B2 | 6/2006 | DeMesa | |
| 7,386,565 B1 * | 6/2008 | Singh et al. | 1/1 |
| 2002/0040639 A1 * | 4/2002 | Duddleson et al. | 92/52 |
| 2002/0049789 A1 * | 4/2002 | Frolich et al. | 707/513 |
| 2002/0107840 A1 * | 8/2002 | Rishe | 707/3 |
| 2002/0143774 A1 * | 10/2002 | Vandersluis | 707/10 |
| 2004/0019586 A1 * | 1/2004 | Harter | 707/1 |
| 2004/0167909 A1 * | 8/2004 | Wakefield et al. | 707/100 |

(Continued)

FOREIGN PATENT DOCUMENTS
EP  0 855 658 A1  7/1998

OTHER PUBLICATIONS

Matson, E. T. Ed—El Kamel A et al., Institute of Electrical and Electronics Engineers: "UmbrellaDB: Heterogeneous Data Source Access Using a Virtual Database Architecture"; IEEE 2002 International Conference on Systems, Man and Cybernetics. (SMC'02), Yasmine Hammamet, Tunesia, Oct. 6-9, 2002, vol. 7 of 7; pp. 592-597.

Neild, T. et al.: "Heterogeneous Database Integration Strategies"; Proceedings of the International Conference on Information Technology Interfaces, Jun. 15, 1999; pp. 311-316.

(Continued)

*Primary Examiner* — Thanh-Ha Dang
(74) *Attorney, Agent, or Firm* — Buckley, Maschoff & Talwalkar LLC

(57) ABSTRACT

Some embodiments include reception of a structured query language query, determination of at least one point data query and at least one relational data query based on the structured query language query, transmission of the at least one point data query to at least one point data server, transmission of the at least one relational data query to at least one relational data server, reception of point data and relational data in response to the point data query and the relational data query, and joining of the received point data and the received relational data into a result rowset.

25 Claims, 9 Drawing Sheets

U.S. PATENT DOCUMENTS

| | | | |
|---|---|---|---|
| 2004/0236767 A1* | 11/2004 | Soylemez et al. | 707/100 |
| 2004/0260706 A1* | 12/2004 | Anonsen et al. | 707/100 |
| 2005/0107897 A1* | 5/2005 | Callaghan | 700/87 |
| 2005/0149584 A1 | 7/2005 | Bourbonnais et al. | |
| 2005/0154765 A1* | 7/2005 | Seitz et al. | 707/104.1 |
| 2005/0165829 A1* | 7/2005 | Varasano | 707/102 |
| 2005/0182784 A1* | 8/2005 | Trappen et al. | 707/102 |
| 2006/0031250 A1* | 2/2006 | Henigman et al. | 707/103 R |
| 2006/0200741 A1 | 9/2006 | DeMesa | |
| 2008/0243872 A1* | 10/2008 | Maida-Smith et al. | 707/10 |
| 2009/0031230 A1* | 1/2009 | Kesler | 715/764 |

OTHER PUBLICATIONS

Haengrae, Cho, et al.: "Prototyping Dime, a Tightly Coupled Heterogeneous Distributed Database System"; Parallel and Distributed Processing, 1995 Proceeding, Euromicro Workshop on San Remo, Italy Jan. 25-27, 1995, Los Alamitos, CA USA IEEE Computer Society Jan. 25, 1995; pp. 296-303.

McAvoy, Tom: "Open Database Connectivity (ODBC) and the Human Machine Interface (HMI) Database"; ISA Tech/Expo Technology Update, Instrument Society of America, Res. Triangle, NC, US, vol. 1, No. Part 1, 1997, pp. 163-172.

PCT/US2007/000346 Search Report dated May 24, 2007.

\* cited by examiner

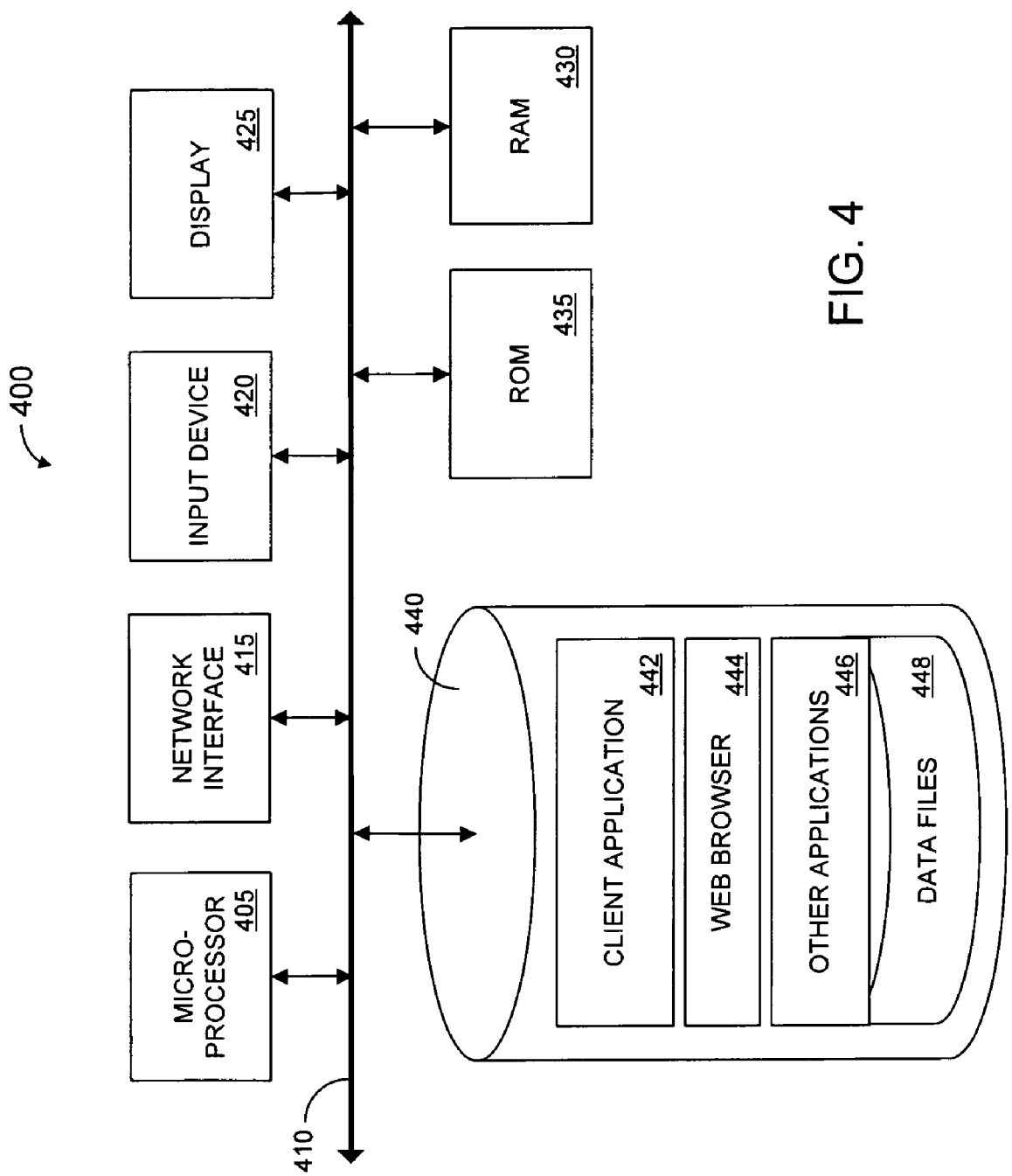

```
select i.name, v.value_real, v.units, t.capacity, t.location
from solution_values as v
join solution_instances as i
on v. name=i.name
join '::Tanks' as t
on t.name=m.name
where name in (
        select name
        from solution_instances
        where parent_path in '::Test.Facility01.Plant01.Unit01'
        and class_name='Tank')
```
} 610

::Tanks

| name | capacity | location |
|---|---|---|
| tk101 | 12,000 | cracker1 |
| tk102 | 12,000 | cracker1 |
| tk201 | 10,000 | cracker2 | solution_values

| name | value_real | units |
|---|---|---|
| tk101 | 10,752.47 | bbl |
| tk102 | 8,452.75 | bbl |
| tk201 | 9,257.33 | bbl |

} 620 solution_instances

| name |
|---|
| tk101 |
| tk102 |
| tk201 | result — 630

| name | value_real | units | capacity | location |
|---|---|---|---|---|
| tk101 | 10,752.47 | bbl | 12,000 | cracker1 |
| tk102 | 8,452.75 | bbl | 12,000 | cracker1 |
| tk201 | 9,257.33 | bbl | 10,000 | cracker2 |

FIG. 6

```
select t.product_name, sum(v.value_real)
from solution_values as v
join solution_instances as i
on v. name=i.name
join '::Tanks' as t
on t.name=m.name
where name in (
        select name
        from solution_instances
        where parent_path in '::Test.Facility01'
        and class_name='Tank')
group by t.product_name
```
710

::Tanks

| product_name | name |
|---|---|
| light sweet crude | tk101 |
| heavy sour crude | tk102 |
| Brent crude | tk201 | solution_instances

| name | parent_path |
|---|---|
| tk101 | ::Test.Facility01 |
| tk102 | ::Test.Facility01 |
| tk201 | ::Test.Facility01 |

720 solution_values

| name | value_real |
|---|---|
| tk101 | 350,752.92 |
| tk102 | 223,972.44 |
| tk201 | 278,552.87 |

730 result

| product_name | value_real |
|---|---|
| light sweet crude | 350,752.92 |
| heavy sour crude | 223,972.44 |
| Brent crude | 278,552.87 |

FIG. 7

```
select t.product_name, sum(v.value_real)
from solution_values as v
join solution_instances as i
on v. name=i.name
join '::Tanks' as t
on t.name=m.name
where name in (
        select name
        from solution_instances
        where parent_path in '::Test.Facility01'
        and class_name='Tank')
and Time_stamp BETWEEN '2006-12-01 00:00:00.000' AND '2007-01-01
00:00:00.000'
group by t.product_name
```
⎫
⎬ 810
⎭

::Tanks

| product_name | name |
|---|---|
| light sweet crude | tk101 |
| heavy sour crude | tk102 |
| Brent crude | tk201 | solution_instances

| name | parent_path |
|---|---|
| tk101 | ::Test.Facility01 |
| tk102 | ::Test.Facility01 |
| tk201 | ::Test.Facility01 |

⎫
⎬ 820
⎭ solution_values

| name | value_real |
|---|---|
| tk101 | 350,752.92 |
| tk102 | 223,972.44 |
| tk201 | 278,552.87 | result  ← 830

| product_name | value_real |
|---|---|
| light sweet crude | 350,752.92 |
| heavy sour crude | 223,972.44 |
| Brent crude | 278,552.87 |

FIG. 8

EFFICIENT SQL ACCESS TO POINT DATA AND RELATIONAL DATA

CROSS REFERENCE TO RELATED APPLICATIONS

This application claims priority to Provisional Application Ser. No. 60/757,793, filed Jan. 9, 2006 and entitled "SQL Access to Real-Time/Historic Point Data and Relational Data from the XHQ System". This application is related to U.S. Pat. Nos. 6,700,590 and 7,069,514, the contents of which are incorporated by reference herein for all purposes.

BACKGROUND

1. Field

The embodiments described below relate generally to retrieval of data from relational database management systems and industrial systems.

2. Discussion

Conventional industrial systems often rely to some extent on computer-based automation and monitoring. For example, data arising from the operation of a manufacturing plant may be acquired, analyzed and responded to if necessary. The data may arise from independent physical elements of the manufacturing plant (e.g., pumps, tanks, etc.), with each element configured to provide substantially raw or native "point" data at pre-defined intervals in real or near real-time. The point data may include numerical values produced by gauges and/or monitors (e.g., speed, temperature, or pressure).

Examples of systems that may acquire, analyze, and act on point data include industrial automation systems, supervisory control and data acquisition (SCADA) systems, and general data acquisition systems. In general, point data obtained from selected sources is subject to dynamic change and is monitored and reported through various operations and functions associated with processing the point data. In industrial automation and control systems, decision support and reporting capabilities may be provided based on point data that is monitored over very short timeframes ranging in the sub-second to sub-minute range.

Monitoring and/or control applications use standard or proprietary Application Programming Interfaces (APIs) to acquire point data from point data sources and/or data historians. Many existing client applications (e.g., report writing applications) are designed to issue queries that comply with a standardized query language in order to access relational data stored in a relational database. It may be desired to use such existing applications to access both point data and relational data. However, the above-mentioned APIs may be difficult to integrate into existing applications.

SUMMARY

In order to address the foregoing, some embodiments concern a system, a method, an apparatus, a medium storing processor-executable process steps, and means to receive a structured query language query, determine at least one point data query and at least one relational data query based on the structured query language query, transmit the at least one point data query to at least one point data server, transmit the at least one relational data query to at least one relational data server, receive point data and relational data in response to the at least one point data query and the at least one relational data query, and join the received point data and the received relational data into a result rowset.

In some embodiments, the point data is derived from an industrial process, which may comprise a continuous process and/or operations of facilities involved in at least one of manufacturing, assembly, natural resource procurement, natural resource refinement, chemical synthesis, water treatment, power generation, power transmission, food processing, beverage processing, raw materials processing, agricultural processing, and materials processing.

The appended claims are not limited to the disclosed embodiments, however, as those in the art can readily adapt the teachings herein to create other embodiments and applications.

BRIEF DESCRIPTION OF THE DRAWINGS

The construction and usage of embodiments will become readily apparent from consideration of the following specification as illustrated in the accompanying drawings, in which like reference numerals designate like parts, and wherein:

FIG. 4 is a block diagram of a client device according to some embodiments;

FIG. 6 includes an SQL query, intermediate rowsets and a result rowset according to some embodiments;

FIG. 7 includes an SQL query, intermediate rowsets and a result rowset according to some embodiments; and FIG. 8 includes an SQL query, intermediate rowsets and a result rowset according to some embodiments.

DETAILED DESCRIPTION

Figure 1:
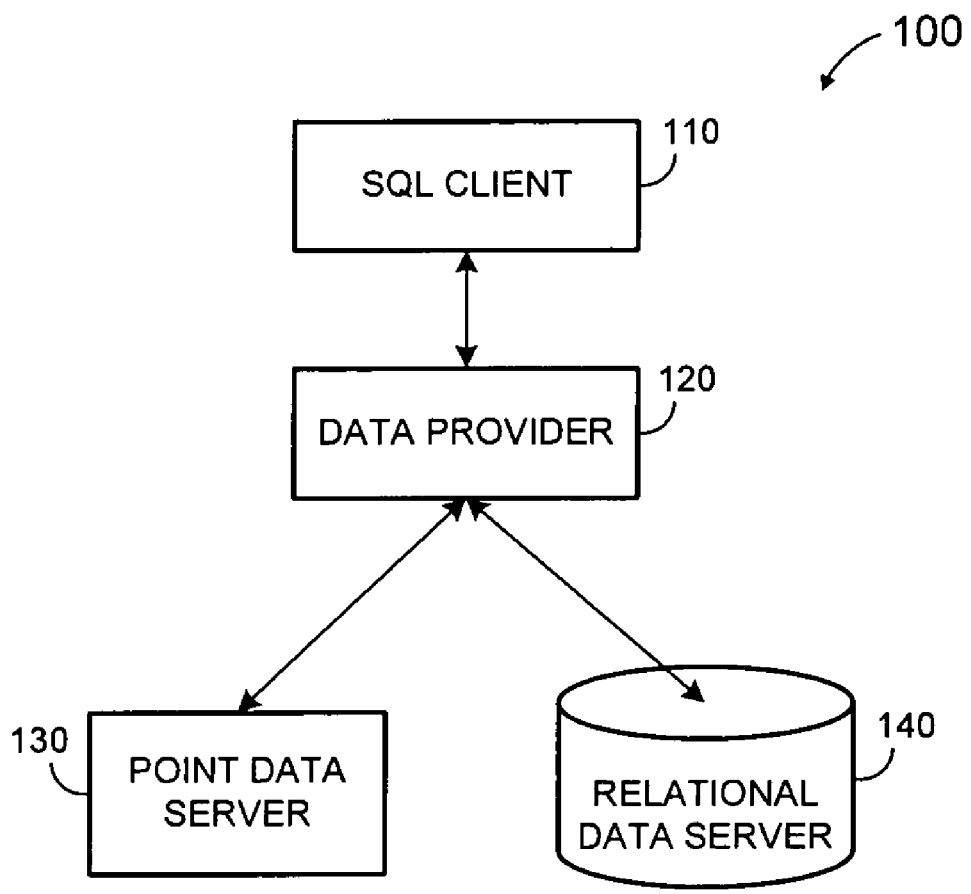
FIG. 1 is a block diagram of a system architecture according to some embodiments.

FIG. 1 illustrates an architecture of system 100 according to some embodiments. Other architectures may be used in conjunction with other embodiments.

System 100 includes structured query language (SQL) client 110, data provider 120, point data server 130 and relational data server 140. Each of elements 110 through 140 may be implemented using any combination of hardware and software, and one or more of such elements may share common hardware and/or software. One or more of elements 110 through 140 may be located remote from one or more other elements, and portions of a single element may be remote from other portions of the single element.

SQL client 110, in some embodiments, may comprise processor-executable program code of a client application. The client application may be capable of generating and transmitting an SQL query for retrieving desired data. According to some embodiments, the desired data may comprise point data and relational data. SQL client 110 may also comprise a device to execute the program code.

Data provider 120 may also comprise program code, and may or may not be integrated into program code providing SQL client 110. Data provider 120 may therefore be implemented as a dynamic link library, code module, kernel element, standalone application and/or in any other manner that is or becomes know. Data provider 120 receives an SQL query from SQL client 110, and determines a point data query and a relational data query based on the SQL query.

Data provider 120 transmits the point data query to point data server 130 and transmits the relational data query to relational data server 140. The point data query may comply with a standard or proprietary API also supported by point data server 130. Point data server 130 may comprise any system for providing client access to point data. Point data server 130 may comprise any system for generating point data as well as any system for storing generated point data such as a data historian. In some embodiments, point data server 130 does not support SQL queries.

Relational data server 140 may comprise any database management system for supporting relational data queries received from data provider 120. The relational data queries may be SQL-compliant or may comply with any other relational database management system.

Point data server 130 may transmit point data to data provider 120 in response to a point data query received therefrom. Similarly, relational data server 140 may receive a relational data query from data provider 120 and return relational data in response thereto. Data provider 120 may thereafter join the point data and the relational data into a rowset and provide the rowset to SQL client 110.

As used herein, point data may be characterized as current, real-time, or value data associated with one or more instruments, components, or portions of a manufacturing, industrial, commercial, or other system. Any of these instruments, components, or portions may be configured to generate, measure, and/or sample point data of interest. For example, a data acquisition system for a particular instrument or machine may continuously or periodically acquire data reflecting a motor's operating speed and/or operating temperature as point data from a point data source associated with the motor. In certain instances, the point data may be a simple numerical value or string value. Point data may further be associated with monitoring, control, and reporting functions of various instruments, components, and applications to provide information relating to the operation of a selected system. This information may also be made available for collection and review by various data acquisition and control systems.

Point data is often acquired in a raw or unstructured form wherein the point data reflects a numerical or string value without supporting details, description, and/or attributes. As previously described, certain types of point data may be associated with real-time or near real-time information (e.g. current temperature, pressure, speed, voltage, current, etc.) that may be desirably sampled, updated or refreshed relatively frequently. The exact frequency of these operations is typically dependent on the characteristics of the point data itself and may be different across the multiple point data sources incorporated into a particular system.

Although system 100 includes only one point data server and one relational data server, embodiments are not limited thereto. In some embodiments, data provider 120 transmits point data queries to two or more point data servers and/or transmits relational data queries to two or more relational data servers. The transmitted queries may be determined based on a single received SQL query.

Figure 2:
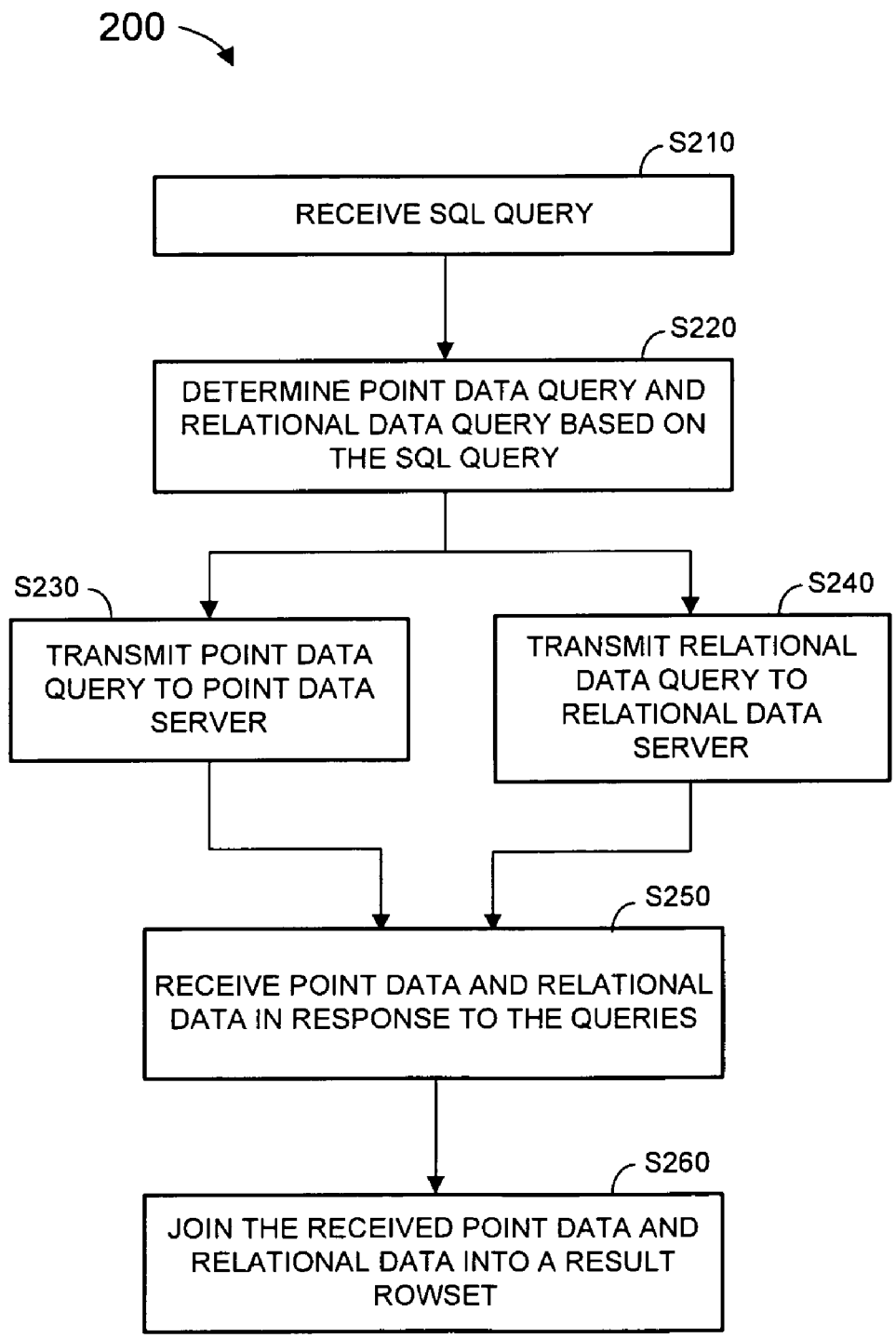
FIG. 2 is a flow diagram of process steps according to some embodiments.

FIG. 2 illustrates process steps 200 according to some embodiments. Process steps 200 may be embodied in one or more software or hardware elements and executed, in whole or in part, by any device or by any number of devices in combination, including but not limited to those devices illustrated in FIG. 1. Moreover, some or all of process steps 200 may be performed manually.

Process steps 200 may be embodied in processor-executable program code read from one or more of a computer-readable medium, such as a floppy disk, a CD-ROM, a DVD-ROM, a Zip™ disk, a magnetic tape, or a signal encoding the process steps, and then stored in a compressed, uncompiled and/or encrypted format. In alternative embodiments, hard-wired circuitry may be used in place of, or in combination with, processor-executable program code for implementation of processes according to some embodiments. Thus, embodiments are not limited to any specific combination of hardware and software.

Initially, at step S210, an SQL query is received from a client. The client may comprise a remote client device, a local client application, or any other suitable client. The SQL query may be generated using currently—or hereafter—known techniques. In some embodiments, the client may generate the SQL query in response to a user request for a particular report or particular data. According to some embodiments, the desired data may comprise point data and relational data.

A point data query and a relational data query are determined at S220 based on the received SQL query. According to some embodiments of S220, a detailed example of which is provided below, the SQL query is parsed to identify requested point data and requested relational data. A point data query for acquiring the requested point data is then generated, as is a relational data query for acquiring the requested relational data. The point data query may comply with a standard or proprietary API for acquiring point data, and the relational data query may comply with a relational database management system.

The point data query is transmitted to a point data server at S230 and is transmitted to a relational data server at S240. In response, point data and relational data are received at S250. Next, at S260, the received point data and relational data are joined into a result rowset. The rowset may thereafter be provided to the SQL client.

Figure 3:
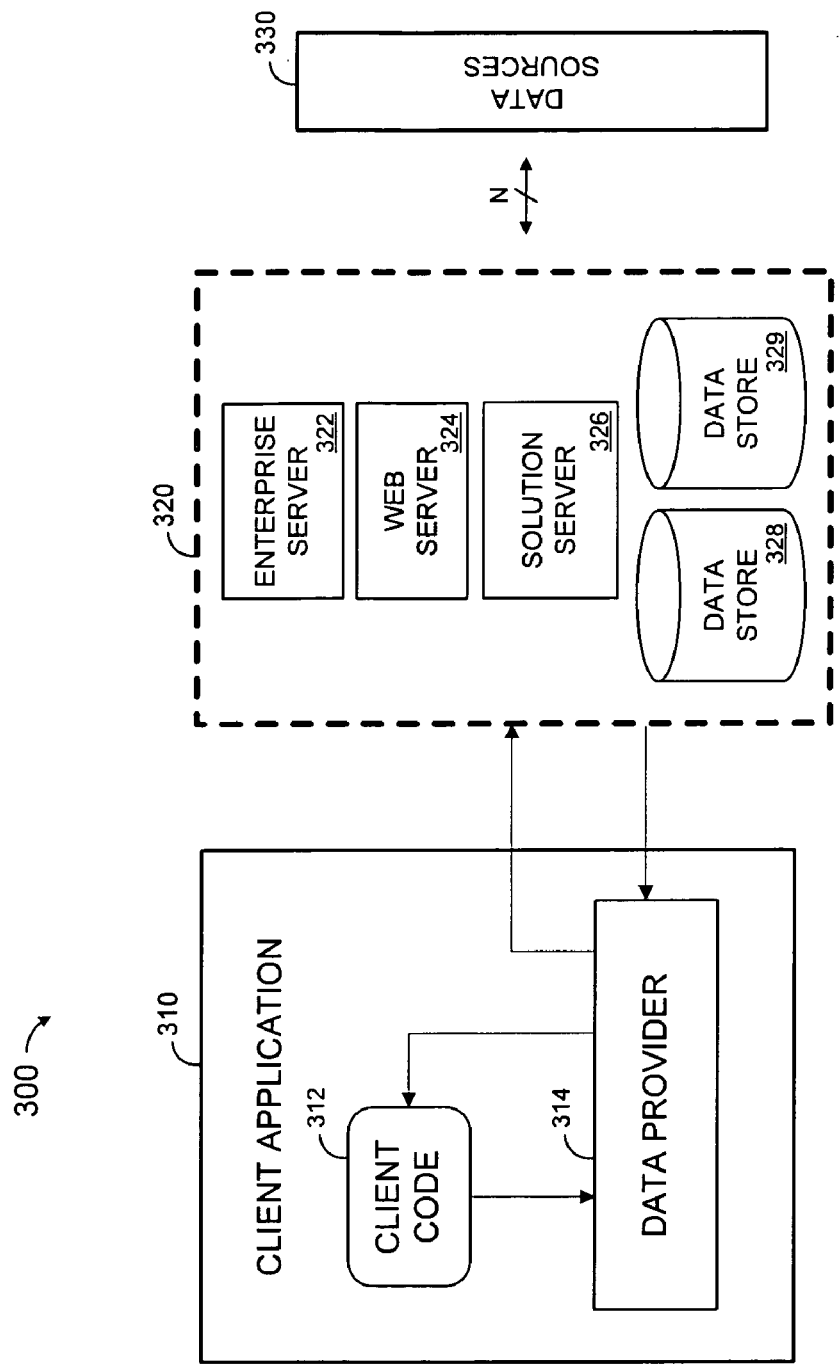
FIG. 3 is a block diagram of a system architecture according to some embodiments.

FIG. 3 is a block diagram of system 300 according to some embodiments. System 300 may implement system 100 of FIG. 1 and/or process 200 of FIG. 2.

System 300 may be used to aggregate real and/or near-real time operations data arising from the operation of an industrial plant. The operations data may represent any type of operation, including but not limited to batch processes, discrete processes, and/or continuous industrial processes employed in the oil industry (e.g., in an oil refinery), gas industry, and/or chemical industry.

In this regard, the various embodiments described herein can be employed in a wide variety of industries and operational facilities. Any industrial process with differing types of operations data may supply data to systems utilizing the invention. For instance, facilities involved with natural resource refinement and procurement, oil and gas procurement, oil and gas refinement, chemical synthesis and refinement, water treatment, power generation, power transmission, food and beverage processing, raw materials processing (e.g. pulp, lumber, metals, and minerals), agricultural processing and materials processing (e.g. steel mills and foundries) may be suited to utilize platforms and software built upon concepts described herein. Additionally, facilities involved in finished goods manufacturing and production such as product assembly lines may utilize one or more embodiments or systems with such features.

These facilities may have various assets, equipment, machinery, flows etc. that produce operations data which may be continuous or discrete and may involve operations data that is presented in batches. Examples include pumps, motors, tanks, pipelines, mills, lathes, mixers, assembly lines, and so on. Operations data may include data from machinery, assets, process historians, maintenance systems, enterprise resource planning systems and the like. Examples of such data include pressure, temperature, capacities, volumes, rates of flow, production totals, inventories, performance indicators and the like.

Client application 310 may be used to present views consisting of point data and relational data. Client application 310 may reside on any suitable user device, including but not limited to a desktop computer, a laptop computer, a computer terminal, a personal digital assistant, a telephone, and a tablet computer.

Client application 310 may include client code 312 and data provider 314. Client code 312 and data provider 314 may be embodied as described above with respect to SQL client 110 and data provider 120, respectively, of system 100. In some embodiments, client code 312 is an ADO.NET data consumer such as a reporting package. Accordingly, data provider 314 may comprise an ADO.NET provider. Data provider 314 may also comprise any SQL-oriented data driver, including but not limited to ODBC, OLE DB, etc.

Data provider 314 may receive SQL queries from client code 312 and may communicate with application environment 320 via a standard or proprietary API to fulfill the queries. Such communication may consist of calling APIs to acquire point data specified in the SQL queries and/or transmitting other SQL queries to acquire relational data specified in the SQL queries.

Application environment 320 may comprise enterprise server 322, Web server 324, and solution server 326. Application environment 320 may comprise a single server device or multiple devices. In various embodiments, enterprise server 322, and solution server 326 comprise application programs developed in Java and/or C++ and running under Windows XP/NT/2000/2003. Application environment 320 may comprise the XHQ™ system from IndX Software Corporation according to some embodiments.

Web server 324 may manage data communication between application environment 320 and client application 310. Accordingly, client application 310 may execute one or more Java applets to interact with Java servlets of Web server 324 according to some embodiments.

Solution server 326 is used to access data from data sources 330. In some embodiments, solution server 326 includes connection groups and connection processes. A connection group includes one or more object instances, each of which is associated with a particular data source of operational data sources 330. Different connection groups are associated with different data sources. A connection process comprises processor-executable program code to retrieve data from a particular type of data source (e.g. an Oracle™ database). A connection process may comply with standard or proprietary protocols, including but not limited to ODBC, JDBC, OPC DA, OPC HDA, OPC AE, and Web Services.

Several different connection groups may use a same connection process to access their respective data sources. Moreover, each object instance may include scripts (e.g. Structured Query Language scripts) to populate itself based on retrieved data. Solution server 326 manages the objects, connection groups and connection processes to access data that is acquired and stored by disparate systems of operational data sources 330.

Solution server 326 may transmit the data acquired from data sources 330 to data store 328 and/or data store 329 for storage according to some embodiments. Data store 328 may comprise a relational database for storing any data used during the operation of application environment 320. Data may be stored in data store 328 according to any currently—or hereafter—known protocol for storing data. Data store 328 may also comprise a relational database management system that is usable to access and/or manage the data stored therein.

Data store 329 may comprise a point data server such as a data historian. A data historian may comprise a database that is optimized for a high rate of data insert. Data store 329 may comprise a point data server to receive point data queries and to provide point data in response.

Commonly-assigned U.S. Pat. No. 6,700,590 describes a system to use a class-based object and view model to collect and display data received from multiple heterogeneous sources. This system encapsulates received point or relational data as objects, which are instantiations of defined components. The use of components and objects may provide reusability, consistency, inheritance and other benefits known to those familiar with object-oriented techniques. The component model may be established and utilized in any manner, including but not limited to those specified in aforementioned U.S. Pat. No. 6,700,590 and/or U.S. Pat. No. 7,069,514, the contents of which are herein incorporated by reference for all purposes. The component model may follow any suitable modeling protocol or format; including those mentioned in the foregoing references.

Data store 329 may therefore receive definitions of objects and/or object collections from solution server 326. Each object and/or object collection may comprise an instantiation of a component defined in the component model. For example, a component may represent a generic pump, with members of the component representing data related to the pump, such as name, location, speed, temperature, etc. An object (or object collection) that is instantiated based on this component may represent a specific physical pump (or several specific physical pumps).

According to some embodiments, a database management system of application environment 320 is associated with data store 328 and determines a plurality of relational database tables based on the received component definitions and object definitions. The relational database tables may reflect some or all of the associations and relationships between data, components and objects within the received definitions. Data stores 328 and 329 may comprise one or more devices and is not limited to a device that exclusively or primarily provides database functionality.

Data sources 330 may comprise various data sources, including but not limited to plant floor production systems, enterprise resource planning data systems, and other data systems. When employed in an industrial context, data arising from data sources 330 may be associated with any aspect of industrial operations, and may consist of point data. Each data source of data sources 330 may comprise one or more disparate hardware and software systems, some of which are not interoperational with one another.

The elements of FIG. 3 may be configured differently than as shown, and each block shown may be implemented by one or more hardware and software elements. The hardware and software elements of one or more blocks may be located remotely from each other. Some embodiments may include less or more elements than those shown.

As described above, data provider 314 may transmit point data queries to two or more point data servers and/or transmits relational data queries to two or more relational data servers. Accordingly, application environment 320 may comprise two or more point data servers and/or two or more relational data servers. Moreover, data provider 314 may transmit point data queries to one or more point data servers which are independent of (i.e., externally connected or unconnected to) application environment 320 (e.g., a point data server of data sources 330), and/or may relational point data queries to one or more relational data servers which are independent of application environment 320.

FIG. 4 is a block diagram of an internal architecture of client device 400 according to some embodiments. Client device may embody SQL client 110 and data provider 120 of system 100 and/or client application 310 of system 300.

Client device 400 includes microprocessor 405 in communication with communication bus 410. Microprocessor 405 may comprise an Intel Itanium™ microprocessor or other type of processor and is used to execute processor-executable program code so as to control the elements of device 400 to provide functionality such as that described herein.

Also in communication with communication bus 410 is network interface 415. Network interface 415 is used to transmit data to and to receive data from devices external to client device 400 such as a device housing Web server 324 of application environment 320. Network interface 415 is therefore preferably configured with hardware suitable to physically interface with desired external devices and/or network connections. For example, network interface 415 may comprise an Ethernet connection to a local area network through which client device 400 may receive and transmit information over the Web.

Input device 420 and display 425 are also in communication with communication bus 410. Any known input device may comprise input device 420, including a keyboard, mouse, touch pad, voice-recognition system, or any combination of these devices. Of course, information may also be input to client device 400 via network interface 415. Display 425 may be an integral or separate CRT display, flat-panel display or the like used to present graphics and text in response to commands issued by microprocessor 405.

According to some embodiments, display 425 displays user interfaces that may be manipulated by a client using input device 420 to request a view or report. Client device 400 may operate to generate an SQL query and proceed as described herein in response to the request.

RAM 430 is connected to communication bus 410 to provide microprocessor 405 with fast data storage and retrieval. In this regard, processor-executable program code being executed by microprocessor 405 is typically stored temporarily in RAM 430 and executed therefrom by microprocessor 405. ROM 435, in contrast, provides storage from which data can be retrieved but to which data cannot be stored. Accordingly, ROM 435 may be used to store invariant process steps and other data, such as basic input/output instructions and data used during boot-up of device 400 or to control network interface 415. One or both of RAM 430 and ROM 435 may communicate directly with microprocessor 405 instead of over communication bus 410.

Data storage device 440 stores, among other data, processor-executable program code of client application 442. Client device 400 may execute client application 442 to provide the functions attributed herein to client application 410 and/or SQL client 110 and data provider 120. Client application 442 may comprise a Java applet or a standalone application suitable for the operating system of client device 442.

Web browser 444 may comprise processor-executable program code of a Web client. As such, client device 400 may execute process steps of Web browser 444 to request and receive Web pages from a Web server such as Web server 324. A Java applet may execute within an execution engine provided by Web browser 444.

Data storage device 440 also includes processor-executable program code of other applications 446. Other applications 446 may include program code to perform calendaring, e-mail functions, word processing, accounting, presentation development and the like. Data storage device 440 may also store process steps of an operating system (unshown). An operating system provides a platform for executing applications, device drivers and other process steps that interact with elements of client device 400. Data files 448 may include any electronic files usable by any application of client device 400.

Figure 5A:
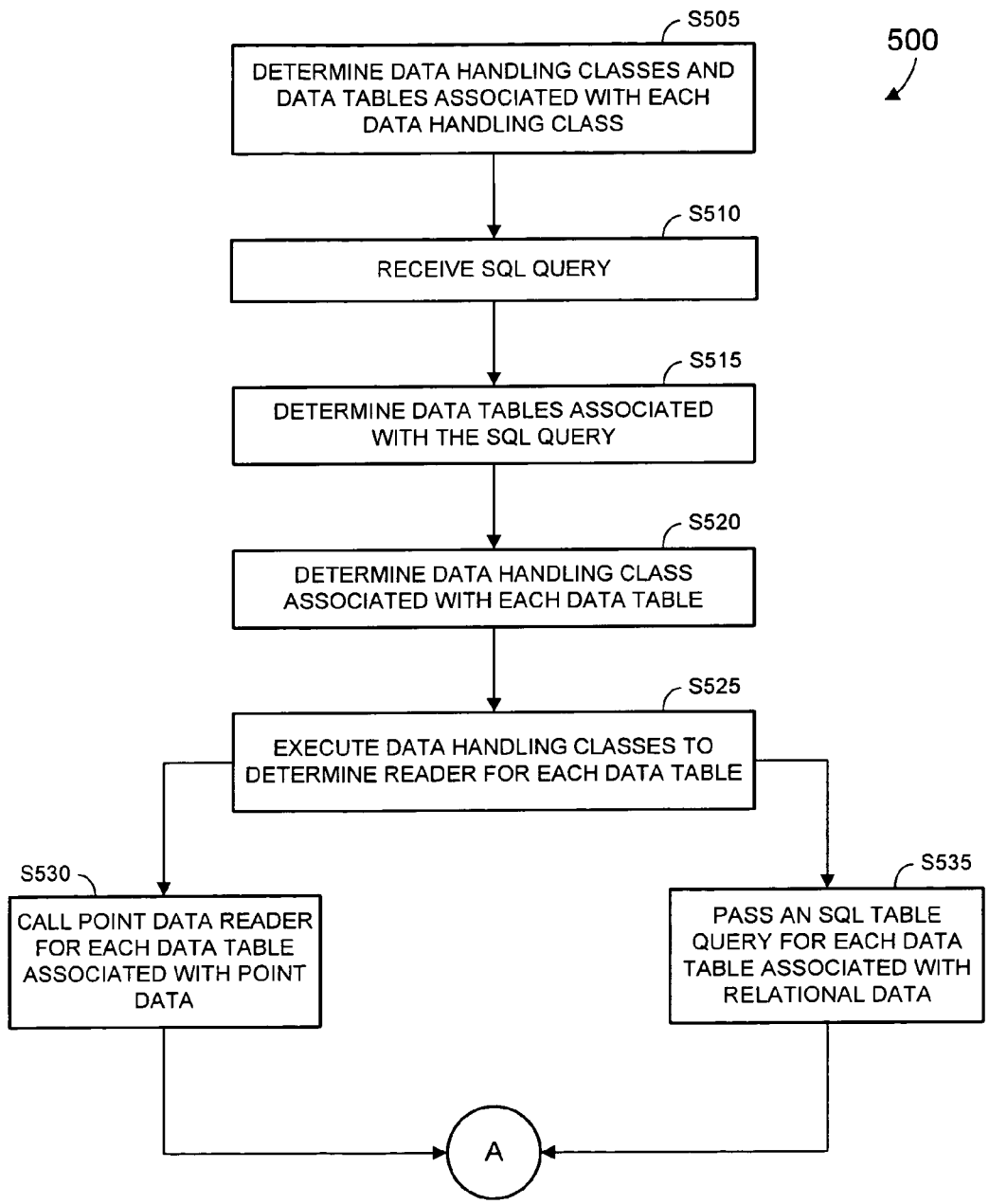
FIGS. 5A and 5B include a flow diagram of process steps according to some embodiments.
Figure 5B:
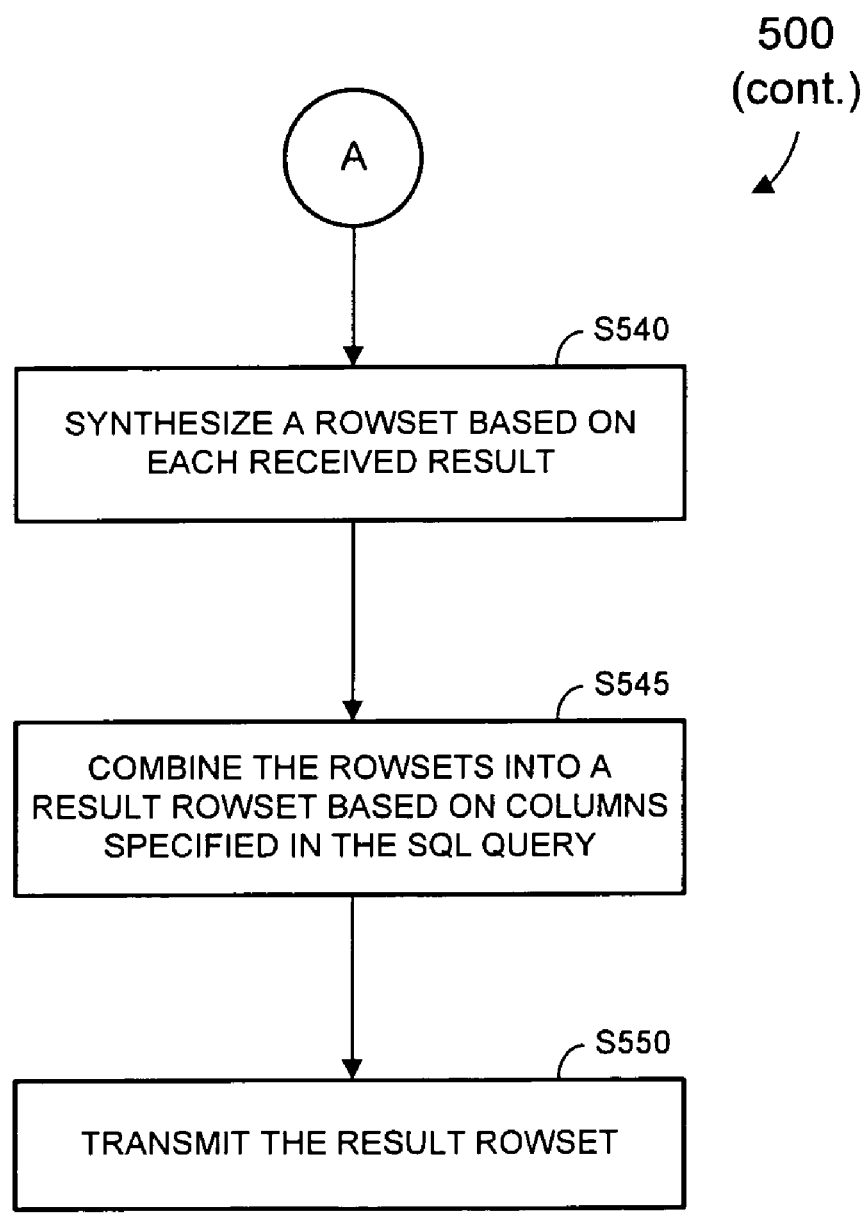

FIGS. 5A and 5B illustrate process 500 according to some embodiments. Process 500 may be embodied in one or more software or hardware elements and executed, in whole or in part, by any device or by any number of devices in combination, including by client device 400. Process 500 may provide standard SQL clients with access to and the ability to coherently combine relational data and real-time/historic data.

Initially, data handling classes are determined at step S505. A data handling class may be used to acquire certain types of data. Also determined are data tables associated with each data handling class. Accordingly, a data handling class may be used to acquire data stored in the data tables that are associated with the data handling class.

In some embodiments, S505 comprises determining available data handling classes and determining the data tables that can be handled by each available data handling class. The following code portion may be used at S505 to return a list of available data handling classes (i.e., "command types"):

```
#region Internal Query Router
internal static IList<Type> InternalCommandTypes
{
get
{
return _commandTypes;
}
}
private static Dictionary<string, Type> _commandTypeDictionary;
internal static void BuildCommandTypeDictionary( )
{
_commandTypeDictionary = new Dictionary<string, Type>( );
foreach (Type commandType in InternalCommandTypes)
{
```

The following code portion may then be used to determine the data tables that can be handled by each data handling class:

```
PropertyInfo tableNames =
commandType.GetProperty("TableNames");
IList<XhqTable> tables =
(IList<XhqTable>)tableNames.GetValue(null,
null);
foreach (XhqTable table in tables)
{
_commandTypeDictionary.Add(table.Name.ToLowerInvariant( ),
commandType);
}
}
}
```

An SQL query is received in S510. The SQL query may require point data and relational data as described above. FIGS. 6 through 8 illustrate SQL queries 610, 710 and 810, respectively, which may be received at S510 according to some embodiments. SQL query 610 is intended to generate an answer to the question "How much oil is currently available in tanks across the unit?" SQL query 710 asks "How much oil is currently available in all tanks in the facility grouped by product type?", and SQL query 810 addresses the question "How much oil was available during December 2006 in all tanks in the facility grouped by product type?"

Returning to process 500, data tables associated with the received SQL query are determined at S515. The associated data tables may be determined based on a "FROM" clause of the SQL query. Taking SQL query 610 as an example, the associated data tables determined at S515 are "::Tanks", "solution_instances", and "solution_values".

A data handling class associated with each determined data table is then determined at S520. The data handling class may be determined based on the associations determined at S505. In a particular example:

```
internal static Command.IXhqCommand RouteQuery(
IdentifierValue fromClause,
CommandBehavior behavior
)
{
Command.IXhqCommand command = null;
XhqCommandBuilder commandBuilder = new
XhqCommandBuilder( );
string tableNameLower = fromClause.NameLower;
Type commandType = null;
_commandTypeDictionary.TryGetValue(tableNameLower,
out commandType);
```

The determined data handling classes are then executed at S525 to determine a data reader for each data table. In a case that a data table is associated with relational data, the data reader may comprise an SQL query (e.g., XhqCollectionCommand) of the data table. The following code portion may implement some embodiments of S525:

```
if (commandType != null)
{
object[ ] constructorParams = { fromClause.Name };
command =
(Command.IXhqCommand)Activator.CreateInstance(commandType,
constructorParams);
}
else if( command == null )
{
command = new
Command.XhqCollectionCommand(fromClause.Name);
}
return command;
}
#endregion
```

A point data reader is called for each data table associated with point data at S530. The point data reader may comprise a standard or proprietary API supported by a point data server. Similarly, an SQL table query is passed at S535 for each data table associated with relational data.

A rowset is synthesized at S540 based on the results of each call and SQL query. Rowsets 620, 720 and 820 illustrate rowsets that may be synthesized based on respective queries 610, 710 and 810 and according to some embodiments of S530 through S540. As shown, rowsets 620, 720 and 820 include relational data as well as point data. Continuing with the present code example, the following code may provide S530 through S540 according to some embodiments:

```
// Read the next available row
public override bool Read( )
{
// no object, so no rows available
if (_Responses == null || _Responses.Count == 0)
return false;
// find a response with rows available
bool hasRows = false;
do
{
hasRows = _Responses[_CurrentResponseIndex].next( );
if (hasRows == false)
{
// no rows found so advance to the next response
_CurrentResponseIndex++;
if (_CurrentResponseIndex >= _Responses.Count)
return false;
}
} while (hasRows == false);
// get the values
_ResultsList = new Dictionary<string, XhqBuffer>(_Columns.Count);
_ResultsArray = new List<XhqBuffer>(_Columns.Count);
VTQ vtq = _Responses[_CurrentResponseIndex].getVTQ( );
XhqFullyQualifiedName fqn =
_FullyQualifiedNames[_Responses[_CurrentResponseIndex].getPath( )];
foreach (Column column in _Columns)
{
XhqBuffer value = new XhqBuffer( );
switch (column.NameLower)
{
case Command.XhqTimeSeriesCommand.FullyQualifiedName:
value.String = _Responses[_CurrentResponseIndex].getPath( );
break;
case Command.XhqTimeSeriesCommand.ParentPath:
if( fqn != null )
value.String = fqn.ParentPath;
break;
case Command.XhqTimeSeriesCommand.Name:
if (fqn != null)
value.String = fqn.Name;
break;
case Command.XhqTimeSeriesCommand.Mid:
value.Int16 = _Responses[_CurrentResponseIndex].getMID( );
break;
case Command.XhqTimeSeriesCommand.ParentOid:
value.Int32 = _Responses[_CurrentResponseIndex].getOID( );
break;
case Command.XhqTimeSeriesCommand.PointCount:
value.Int32 = _PointCount;
break;
case Command.XhqTimeSeriesCommand.ActualPointCount:
value.Int32 = _Responses[_CurrentResponseIndex].getSize( );
break;
default:
value = ReadVtqColumn(vtq, column);
break;
}
_ResultsList.Add(column.Name, value);
_ResultsArray.Add(value);
}
return hasRows;
}
```

The rowsets are combined at S545 into a result rowset based on columns specified in the received SQL query. The rowsets may be combined in some embodiments using a nested loop or hash algorithm and based on columns specified in a JOIN clause of the SQL query. For example, result rowsets 630, 730 and 830 reflect a combination of respective rowsets 620, 720 and 820 based on JOIN clauses of respective SQL queries 610, 710 and 810.

The result rowset is transmitted at S550. The result rowset may be transmitted to the entity from which the original SQL query was received.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A method comprising:

receiving, by a processor, a structured query language query;

determining, by the processor, at least one point data query and at least one relational data query based on the structured query language query;

transmitting the at least one point data query to at least one point data server;

transmitting the at least one relational data query to at least one relational data server;

receiving, by the processor, point data and relational data in response to the point data query and the relational data query; and joining, by the processor, the received point data and the received relational data into a result rowset;

wherein the receiving point data and relational data in response to the point data query and the relational data query comprises:

receiving, from the at least one point data server in response to the at least one point data query that is based on the structured query language query, point data that has been collected from multiple heterogeneous sources based on components defined according to a class-based object model and encapsulated as object instantiations of the components;

wherein the at least one point data server is to receive the object instantiations of the components defined according to the class-based object model; and wherein the point data is current, real-time or value data associated with one or more instruments, components, or portions of a manufacturing, industrial, commercial, or other system.

2. The method according to claim 1, wherein the point data is derived from an industrial process.

3. The method according to claim 2, wherein the industrial process comprises a continuous process.

4. The method according to claim 2, wherein the industrial process comprises operations of facilities involved in at least one of manufacturing, assembly, natural resource procurement, natural resource refinement, chemical synthesis, water treatment, power generation, power transmission, food processing, beverage processing, raw materials processing, agricultural processing, and materials processing.

5. The method according to claim 4, wherein the natural resource procurement comprises procurement of at least one of oil and natural gas, and wherein the natural resource refinement comprises refinement of at least one of oil and natural gas.

6. The method according to claim 1, wherein determining the at least one point data query and the at least one relational data query based on the structured query language query comprises:

determining a plurality of data tables associated with the structured query language query;

determining a data handling class associated with each of the plurality of data tables; and executing each determined data handling class to determine a reader for each of the plurality of data tables.

7. The method according to claim 6, wherein transmitting the at least one point data query to at least one point data server comprises:

calling a determined point data reader for each of the plurality of data tables associated with point data, and wherein transmitting the at least one relational data query to at least one relational data server comprises:

passing a second structured query language query for each of the plurality of data tables associated with relational data.

8. The method according to claim 1, wherein joining the received point data and the received relational data into a result rowset comprises:

synthesizing a first rowset based on the received point data;

synthesizing a second rowset based on the received relational data; and combining the first rowset and the second rowset into the result rowset based on columns specified in the structured query language query.

9. The method according to claim 1, wherein the at least one point data query is separate from the at least one relational data query.

10. A non-transitory computer readable medium storing computer-executable program code, the program code comprising:

code to receive a structured query language query;

code to determine at least one point data query and at least one relational data query based on the structured query language query;

code to transmit the at least one point data query to at least one point data server;

code to transmit the at least one relational data query to at least one relational data server;

code to receive point data and relational data in response to the point data query and the relational data query; and code to join the received point data and the received relational data into a result rowset;

wherein the code to receive point data and relational data in response to the point data query and the relational data query comprises:

code to receive, from the at least one point data server in response to the at least one point data query that is based on the structured query language query, point data that has been collected from multiple heterogeneous sources based on components defined according to a class-based object model and encapsulated as object instantiations of the components; and wherein the at least one point data server is to receive the object instantiations of the components defined according to the class-based object model; and wherein the point data is current, real-time or value data associated with one or more instruments, components, or portions of a manufacturing, industrial, commercial, or other system.

11. The non-transitory computer readable medium according to claim 10, wherein the point data is derived from an industrial process.

12. The non-transitory computer readable medium according to claim 11, wherein the industrial process comprises a continuous process.

13. The non-transitory computer readable medium according to claim 11, wherein the industrial process comprises operations of facilities involved in at least one of manufacturing, assembly, natural resource procurement, natural resource refinement, chemical synthesis, water treatment, power generation, power transmission, food processing, beverage processing, raw materials processing, agricultural processing, and materials processing.

14. The non-transitory computer readable medium according to claim 13, wherein the natural resource procurement comprises procurement of at least one of oil and natural gas, and wherein the natural resource refinement comprises refinement of at least one of oil and natural gas.

15. The non-transitory computer readable medium according to claim 10, wherein the code to determine the at least one point data query and the at least one relational data query based on the structured query language query comprises:
- code to determine a plurality of data tables associated with the structured query language query;
- code to determine a data handling class associated with each of the plurality of data tables; and
- code to execute each determined data handling class to determine a reader for each of the plurality of data tables.

16. The non-transitory computer readable medium according to claim 15, wherein the code to transmit the at least one point data query to at least one point data server comprises:
- code to call a determined point data reader for each of the plurality of data tables associated with point data, and
- wherein the code to transmit the at least one relational data query to at least one relational data server comprises:
- code to pass a second structured query language query for each of the plurality of data tables associated with relational data.

17. The non-transitory computer readable medium according to claim 10, wherein the code to join the received point data and the received relational data into a result rowset comprises:
- code to synthesize a first rowset based on the received point data;
- code to synthesize a second rowset based on the received relational data; and
- code to combine the first rowset and the second rowset into the result rowset based on columns specified in the structured query language query.

18. The non-transitory computer readable medium according to claim 10, wherein the at least one point data query is separate from the at least one relational data query.

19. A system comprising:
a device to provide:
- a data provider to receive a structured query language query, to determine at least one point data query and at least one relational data query based on the structured query language query, to transmit the at least one point data query, and to transmit the at least one relational data query;

one or more devices to provide:
- at least one point data server to receive the at least one point data query and to transmit point data to the data provider in response; and
- at least one relational data server to receive the at least one relational data query and to transmit relational data to the data provider in response,
- wherein the data provider is further to join the point data and the relational data into a result rowset;
- wherein the at least one point data server to receive the at least one point data query and to transmit point data to the data provider in response comprises:
  - at least one point data server to receive the at least one point data query that is based on the structured query language query and to transmit point data, to the data provider, that has been collected from multiple heterogeneous sources based on components defined according to a class-based object model and encapsulated as object instantiations of the components; and
- wherein the at least one point data server is to receive the object instantiations of the components defined according to the class-based object model; and
- wherein the point data is current, real-time or value data associated with one or more instruments, components, or portions of a manufacturing, industrial, commercial, or other system.

20. The system according to claim 19, wherein the point data is derived from a continuous industrial process.

21. The system according to claim 20, wherein the industrial process comprises operations of facilities involved in at least one of manufacturing, assembly, natural resource procurement, natural resource refinement, chemical synthesis, water treatment, power generation, power transmission, food processing, beverage processing, raw materials processing, agricultural processing, and materials processing.

22. The system according to claim 19, wherein determination of the at least one point data query and the at least one relational data query based on the structured query language query comprises:
- determination of a plurality of data tables associated with the structured query language query;
- determination of a data handling class associated with each of the plurality of data tables; and
- execution of each determined data handling class to determine a reader for each of the plurality of data tables.

23. The system according to claim 22, wherein transmission of the at least one point data query to at least one point data server comprises:
- calling of a determined point data reader for each of the plurality of data tables associated with point data, and
- wherein transmission of the at least one relational data query to at least one relational data server comprises:
- passage of a second structured query language query for each of the plurality of data tables associated with relational data.

24. The system according to claim 19, wherein joining of the received point data and the received relational data into a result rowset comprises:
- synthesis of a first rowset based on the received point data;
- synthesis of a second rowset based on the received relational data; and
- combination of the first rowset and the second rowset into the result rowset based on columns specified in the structured query language query.

25. The system according to claim 19, wherein the at least one point data query is separate from the at least one relational data query.

* * * * *